United States Patent
Kramer

(10) Patent No.: US 9,669,741 B2
(45) Date of Patent: Jun. 6, 2017

(54) SIDE PANEL OF A VEHICLE SEAT WITH A DEFORMATION ZONE

(71) Applicant: Volkswagen Aktiengesellschaft, Wolfsburg (DE)

(72) Inventor: Matthias Kramer, Braunschweig (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 15/075,615

(22) Filed: Mar. 21, 2016

(65) Prior Publication Data

US 2016/0280101 A1   Sep. 29, 2016

(30) Foreign Application Priority Data

Mar. 23, 2015   (DE) .................. 10 2015 205 231

(51) Int. Cl.
*B60N 2/42*    (2006.01)
*B60N 2/427*   (2006.01)
*B60R 22/28*   (2006.01)

(52) U.S. Cl.
CPC ....... *B60N 2/4249* (2013.01); *B60N 2/42709* (2013.01); *B60R 22/28* (2013.01)

(58) Field of Classification Search
CPC .. B60N 2/4249; B60N 2/42709; B60R 22/28; B60R 2022/283
USPC .................... 297/216.1, 471, 472
See application file for complete search history.

(56) References Cited

U.S. PATENT DOCUMENTS

| | | | | |
|---|---|---|---|---|
| 3,361,475 A * | 1/1968 | Villiers | ............. | B60R 22/28 188/268 |
| 3,362,749 A * | 1/1968 | Clement | ............. | B60N 2/466 267/95 |
| 3,957,304 A * | 5/1976 | Koutsky | ............. | B60N 2/4249 248/393 |
| 5,445,430 A * | 8/1995 | Nichols | ............. | B60N 2/466 280/751 |
| 5,971,488 A | 10/1999 | Pedronno et al. | | |
| 6,176,543 B1 * | 1/2001 | Nawata | ............. | B60N 2/1615 296/187.11 |
| 6,397,688 B1 * | 6/2002 | Sakamoto | ............. | B60N 2/002 177/144 |
| 6,561,300 B1 * | 5/2003 | Sakamoto | ............. | B60N 2/002 180/273 |
| 7,360,832 B2 * | 4/2008 | Yokota | ............. | B60N 2/4228 297/216.1 |
| 7,735,865 B2 * | 6/2010 | Cappabianca | ............. | B60R 21/045 180/90 |
| 7,828,388 B2 * | 11/2010 | Thomas | ............. | B60N 2/4235 296/1.09 |

(Continued)

FOREIGN PATENT DOCUMENTS

DE   42 08 150 A1   9/1993
DE   198 02 346 A1   7/1998

(Continued)

*Primary Examiner* — Laurie K Cranmer
(74) *Attorney, Agent, or Firm* — Muncy, Geissler, Olds & Lowe, P.C.

(57) ABSTRACT

A vehicle seat is provided with a seat-mounted cover that includes a side panel. Provision is made that at least one predetermined breaking point is formed, at least in a critical region of the side panel in which a high crash force acts in the event of a possible crash.

13 Claims, 3 Drawing Sheets

(56) References Cited

U.S. PATENT DOCUMENTS

| | | | | |
|---|---|---|---|---|
| 8,047,605 B2* | 11/2011 | Yamazaki | ............ | B60N 2/4228 297/216.1 |
| 8,240,758 B2* | 8/2012 | Combest | ............. | B60N 2/4221 297/216.1 |
| 8,632,117 B1* | 1/2014 | Sanchez Cruz | ........ | B60N 2/466 296/153 |
| 9,114,742 B2* | 8/2015 | Nakanishi | .......... | B60N 2/42709 |
| 9,114,773 B2* | 8/2015 | Sundararajan | ...... | B60R 21/0428 |
| 9,358,903 B2* | 6/2016 | Maurer | ................ | B60N 2/0722 |
| 2001/0052724 A1* | 12/2001 | Kamper | ............. | B60N 2/4228 297/452.2 |
| 2007/0296252 A1* | 12/2007 | Mattes | ................... | B60N 2/242 297/216.1 |
| 2009/0267391 A1* | 10/2009 | Honnorat | ................ | F16F 7/123 297/216.17 |
| 2010/0156153 A1* | 6/2010 | Gross | ................ | B60N 2/42736 297/216.1 |
| 2012/0274115 A1* | 11/2012 | Smith | ................... | B60N 2/688 297/354.1 |

FOREIGN PATENT DOCUMENTS

| | | |
|---|---|---|
| DE | 102 04 272 A1 | 8/2003 |
| DE | 103 56 947 B3 | 2/2005 |
| DE | 10 2011 018 310 A1 | 10/2012 |
| JP | 2002-012072 A | 1/2002 |

\* cited by examiner

SIDE PANEL OF A VEHICLE SEAT WITH A DEFORMATION ZONE

This non-provisional application claims priority under 35 U.S.C. §119(a) to German Patent Application No. 10 2015 205 231.1, which was filed in Germany on Mar. 23, 2015, and which is herein incorporated by reference.

BACKGROUND OF THE INVENTION

Field of the Invention

The invention relates to a vehicle seat with a seat-mounted cover that includes a side panel.

Description of the Background Art

It is known from the prior art to provide covers or panels that are fastened to a structure or to a seat adjuster by means of mounting elements.

Mounting elements of this nature are also referred to as seat panel holders. These seat panel holders usually are wire frames formed into complex shapes, which are connected at one side to the seat structure of a vehicle seat and at the other side to the panel.

It has become apparent that the panel is subjected to forces in the region where a seat belt contacts the panel, in particular in the event of a crash. These crash forces jeopardize the structural stability of the panel, especially in the region of the seat belt contacting the panel, especially the lap belt portion of the seat belt. The panel thus has a critical region in the region of action of the forces acting on the panel that is subjected to especially high stresses in the event of a crash, especially in the event of a frontal crash.

Panels are known whose structure is reinforced, and thus stabilized, on their inside with regard to their stability in critical regions jeopardized by the effects of force using inserts made of expanded polypropylene. The inserts are glued or otherwise fastened to the panel.

SUMMARY OF THE INVENTION

It is therefore an object of the invention to provide a side panel for a vehicle seat that safely absorbs forces acting on it in the event of a crash.

In an exemplary embodiment, a vehicle seat is provided with a seat-mounted cover that includes a side panel. Provision is made according to an exemplary embodiment of the invention that at least one predetermined breaking point is formed at least in a critical region of the side panel in which a high crash force acts in the event of a possible crash.

The side panel of the cover of the vehicle can include at least one predetermined breaking point that is formed on the side panel in the critical region in which a high crash force acts in the event of a possible crash. This ensures that the side panel breaks along the predetermined breaking point. In the event of a crash, it is thus defined via the predetermined breaking point where the break in the side panel occurs. In this way, the manufacturer of the side panel has the ability through targeted design of the predetermined breaking point to create a side panel that not only absorbs crash forces but also breaks in a defined and desired manner at the desired position.

In an embodiment of the invention, provision is made that the predetermined breaking point is at least one linear indentation. The linear form creates a linear predetermined breaking point in an advantageous manner. The linear predetermined breaking point can be intentionally aligned such that it is predictable in the event of a crash where the side panel breaks and in which direction the side panel will break. Furthermore, the introduction of a linear indentation during manufacture or after the manufacture of the side panel is an economical measure that is simple to accomplish.

The at least one linear indentation can be formed on an inside of the side panel. In this way, the external appearance of the side panel remains unchanged in an advantageous manner.

The at least one linear indentation of the side panel can extend substantially in a longitudinal direction and in a horizontal direction of the side panel that is arranged in an operating position on the vehicle seat.

This advantageously achieves the result that when the crash force acts on the side panel, the break or crack through the predetermined breaking point, which can be implemented as an indentation, extends in the desired horizontal direction in a defined manner. Moreover, because of the break in the longitudinal direction of the side panel, fracture edges that lie parallel to a belt axis of a lap belt section are avoided, avoiding the risk that the fracture edges may cut into the lap belt section in an unwanted manner.

Furthermore, the at least one linear indentation can be arranged to extend horizontally, at least in a vertical wall region of the side panel located in the critical region. In the operating position, the side panel has a vertical and a horizontal wall region. The at least one indentation can be introduced into the vertical wall region, which ensures that the break takes place on the lateral surface of the side panel so that the fracture edge of the side panel occurring in the event of a crash not only occurs in the longitudinal direction of the side panel, but also, due to the lateral orientation, faces away from a person sitting on the seat portion of the vehicle seat above the side panel. Moreover, because of the break in the longitudinal direction, fracture edges that lie parallel to a belt axis of a lap belt section are avoided, avoiding the risk that the fracture edges may cut into the lap belt section in an unwanted manner.

In an embodiment, provision is made that the at least one linear indentation can be arranged to extend substantially horizontally in a horizontal wall region located in the critical region in the side panel arranged in the operating position and in the vertical wall region located in the critical region in the side panel arranged in the operating position. Here, the indentation in the side panel creates a transition from the horizontal wall region to the vertical wall region. The horizontal wall region is pushed away in the direction of force when the crash force acts. Shear forces arise within the side panels that encounter the at least one linear indentation. Due to the compression of the horizontal wall region, the side panel begins to break in the critical region in the horizontal wall region, since the indentation is continued into the horizontal wall region in an advantageous manner. The break or crack is guided in an advantageous manner along the linear indentation, and consequently along the predetermined breaking line, into the vertical wall region, which ultimately ensures that the break takes place on the lateral surface of the side panel, so that the fracture edge of the side panel occurring in the event of a crash not only occurs in the longitudinal direction of the side panel, but also, due to the lateral orientation, faces away from a person sitting on the seat portion of the vehicle seat above the side panel.

In an embodiment, the at least one linear indentation is part of a weakening structure.

A first exemplary weakening structure can comprises multiple linear indentations that are arranged to be parallel to one another and to extend horizontally substantially in the longitudinal direction of the side panel in its operating position.

A second exemplary weakening structure can include grid structure that comprises multiple linear indentations that are arranged to be parallel to one another and to extend horizontally substantially in the longitudinal direction of the side panel in its operating position, and that additionally comprises multiple linear indentations that are arranged to extend substantially horizontally perpendicular and vertically perpendicular to the multiple linear indentations arranged horizontally in the longitudinal direction.

Furthermore, at least one of the multiple linear indentations that are arranged to be substantially parallel to one another and to extend horizontally substantially in the longitudinal direction of the side panel in the operating position is made more deeply in the material of the side panel than the neighboring indentation(s).

This advantageously makes it possible to have an even better influence over which of the indentations of a weakening structure breaks or tears, or which of the indentations of a weakening structure breaks or tears first. One or more indentation(s) chosen in advance is/are recessed into the material of the side panel. A simple procedure that achieves the desired effect of a defined break at the intended location and in the intended orientation.

In an exemplary embodiment, the direction located in the longitudinal direction of the vehicle shall be labeled "x". The label "y" designates the direction perpendicular to the x-direction in the horizontal plane of the vehicle, and "z" designates the direction in the vertical plane of the vehicle perpendicular to the x-direction. A vehicle seat can be arranged in its normal operating position in the vehicle. A side panel facing a lateral body of the vehicle is thus located at the side of the vehicle seat located in the normal operating position, and extends in the x-direction. This foregoing system of notation for the spatial directions in Cartesian coordinates corresponds to the coordinate system generally used in the automotive industry. The same reference numbers are used below for like components in all figures, wherein components that have already been introduced may not all be explained again in each figure on the basis of the reference numbers.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
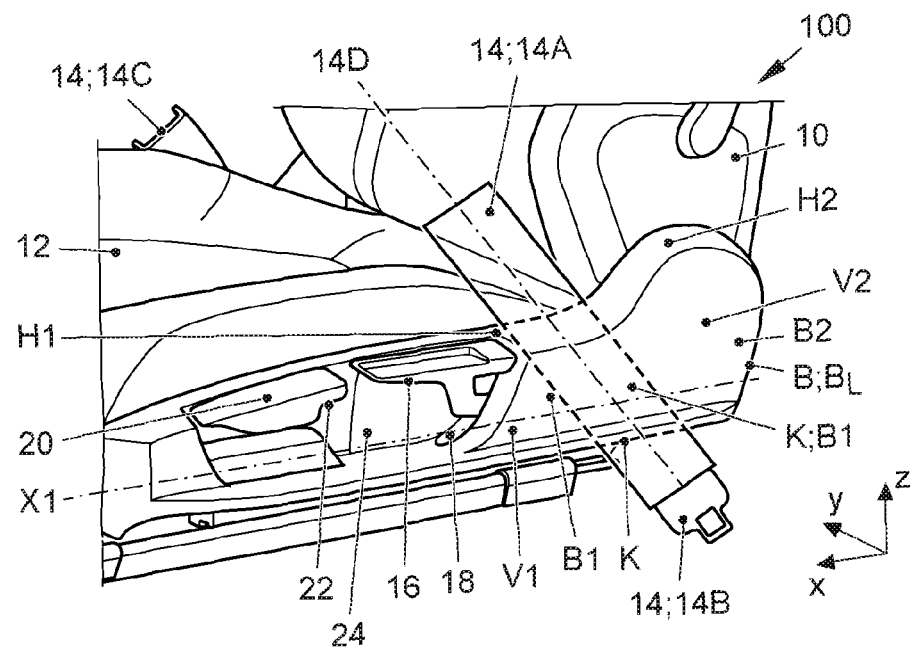
FIG. 1 is a perspective representation of a vehicle seat with a seat belt and with a left-hand side panel, viewed in the direction of travel, of a seat cover of the vehicle seat.
Figure 2:
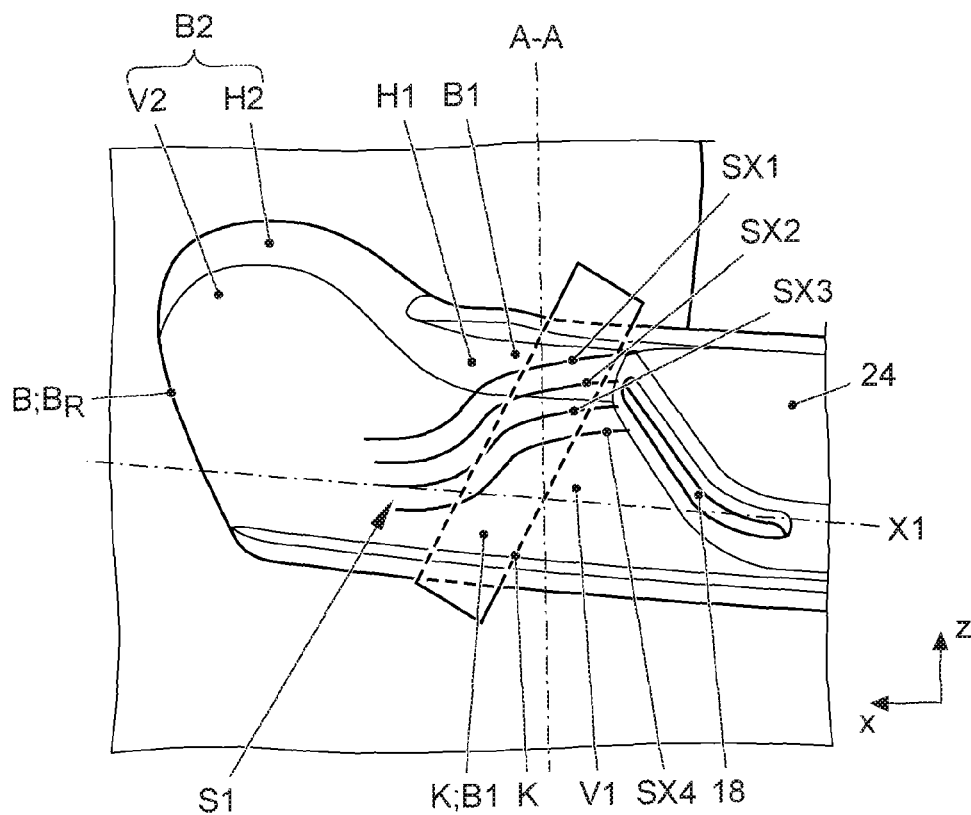
FIG. 2 is an exterior view of a right-hand side panel, viewed in the direction of travel, with a first weakening pattern.
Figure 3:
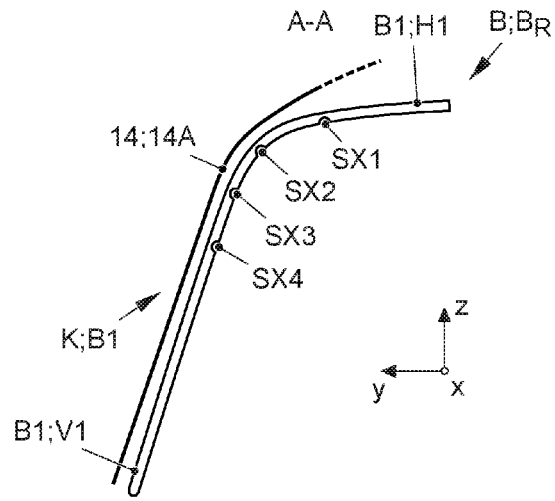
FIG. 3 is a section A-A through the right side panel from FIG. 2.
Figure 4:
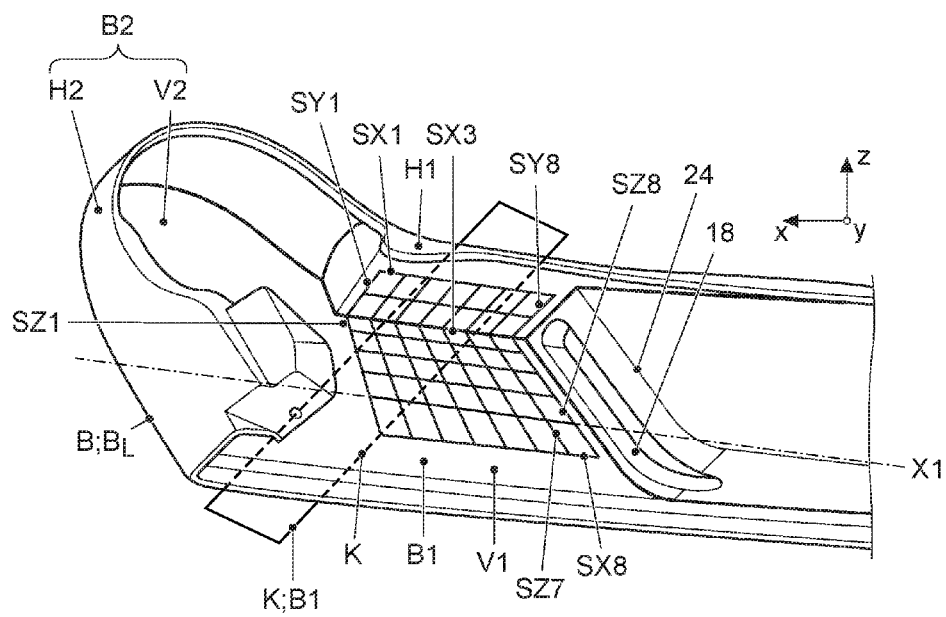
FIG. 4 is an interior view of the left side panel from FIG. 1 with a second weakening pattern.

A panel B according to the invention is implemented as a left panel $B_L$ or a right panel $B_R$. FIGS. 1 and 4 show the left panel $B_L$ from outside and inside. FIG. 2 shows the right panel $B_R$ from outside, while FIG. 3 shows a section A-A through the right panel $B_R$.

The perspective side view in FIG. 1 shows a vehicle seat 100 with a backrest portion 10 and a seat portion 12 and with the left panel $B_L$ viewed in the direction of travel.

Viewed in its longitudinal direction, the left side panel $B_L$ is arranged to extend in the x-direction (direction of travel) at the side of an adjoining structure—not visible—of the seat portion 12.

A longitudinal axis of the side panel $B_L$ extending in the x-direction is labeled with the reference number X1.

In FIG. 1, the left side panel $B_L$ is already in the installed state. In this installed state, the side panel $B_L$ is attached to the structure—not visible—of the seat portion 12 by a panel holder—not visible—in an assembled state.

Generally, the panel holder of the side panel $B_L$ is integrated into the side panel $B_L$ in the assembled state, with the panel holder providing for a positioning of the side panel $B_L$ on the structure. The panel holder additionally imparts a certain dimensional stability to the side panel $B_L$ in the assembled state.

FIG. 1 also shows the outlines of a lap belt portion 14A of a seat belt 14.

In the event of a crash, a very large crash force acts on the side panel $B_L$ in a critical region K (see outlining of the lap belt portion 14A in dashed lines) of the side panel $B_L$ through the lap belt portion 14A of the seat belt 14. Particularly in the case of a frontal crash, an especially high crash force acts on the critical region K.

The critical region K is also referred to as a deformation zone, with the critical region K representing the zone in which the crash forces act on the side panel $B_L$ through the lap belt portion 14A, and in which the most severe deformation of the side panel $B_L$ is caused in the event of a crash.

In the exemplary embodiment, the side panel $B_L$ has a recess 24 that is formed in the y-direction and is open to the top in the z-direction.

Oriented in the x-direction in the recess 24 is a height adjustment lever 16 of the vehicle seat 100 that is passed through the side panel $B_L$ through a slot-like opening 18. The opening 18 accordingly faces in the x-direction. Located inside the panel $B_L$ is a mechanism for the height adjustment lever 16 that is fixed to the structure and for which appropriate installation space is reserved in the side panel $B_L$.

Also oriented in the x-direction in the recess 24 is a seatback release lever 20 of the vehicle seat 100 that is passed through the side panel $B_L$ in the y-direction through an additional opening 22 (not visible). Located behind the panel $B_L$ is a mechanism for the seatback release lever 20 that is fixed to the structure and for which appropriate installation space is likewise reserved in the side panel $B_L$.

The side panel $B_L$ has a first region B1 that essentially comprises a first vertical wall region V1 located in an x-z plane and a first horizontal wall region H1 located in an x-y plane.

The vertical wall region V1 and the horizontal wall region H1 transition into a second region B2 that essentially comprises a circular, second vertical wall region V2 in the same x-z plane as the first vertical wall region V1 and a substantially circular, second horizontal wall region H2 above the first horizontal wall region H1.

In the second vertical wall region V2, rotary adjusters for changing the angle of the backrest portion may be located in different side panel embodiments that are not shown. A rotary adjuster of this nature is not shown here, however. To pass a shaft of a rotary adjuster through the side panel $B_L$, an opening is then provided in the second vertical wall region V2 for placement of a rotary adjuster.

In the normal operating position, the lap belt portion 14A of the seat belt 14 runs, depending on the person, essentially along the first region B1 of the side panel $B_L$ toward the pelvis of a person—not shown—sitting on the vehicle seat 100.

The lap belt portion 14A includes a mounting element 14B with which the lap belt portion 14A is mounted to the body, generally to the B pillar of a vehicle in the lower region of the B pillar. Shown on the opposite side is the body-mounted seat belt buckle 14C for closing the lap belt portion 14A by means of the belt buckle at its end, not shown, and thus for closing the seat belt 14 as a whole.

The above remarks make it clear that, due to its geometric structure with various recesses 24 and openings 18, 22, the side panel $B_L$ represents a relatively unstable component with regard to overall structural stability before assembly, but which after assembly is attached relatively stably and securely to the seat structure of the seat portion 12 by the panel holder.

The critical region K, or the deformation zone most severely stressed in the event of a crash, is located in the first region B1 of the side panel $B_L$. The critical region K is established by the high crash force transmitted through the flat lap belt portion 14A to the first region B1 of the side panel $B_L$ in the event of a crash.

In the event of a crash, unwanted material destruction may occur in the critical region K. In the first region B1 where the critical region K is located, the side panel $B_L$ has no recesses or openings. This first region B1 thus represents a region that stabilizes the side panel 10 relatively strongly.

In the event of a crash, a very large crash force acts on the side panel $B_L$ in the critical region K (see corresponding outlining in dashed lines in FIG. 2) of the side panel $B_L$ through the lap belt portion 14A of the seat belt 14. Particularly in the case of a frontal crash, an especially high crash force acts on the critical region K.

The application of force in the event of a crash can lead to cracks, which primarily extend crosswise to the longitudinal axis X1 of the side panel $B_L$, or in other words along or parallel to the belt axis 14A-1 of the lap belt portion 14A. As a result, sharp edges in the destroyed material of the side panel $B_L$ can form in the first region B1 that attack the edge or edges of the lap belt portion 14A, possibly resulting in cutting of the lap belt portion 14A there.

This condition potentially arising in the event of a crash is not counteracted by a material reinforcement as previously, but instead provision is made according to the invention that the side panel $B_L$ forms a crack in a controlled manner in at least one location provided for this purpose, which crack runs in the longitudinal direction X1 of the side panel $B_L$, or in other words crosswise to the belt axis 14A-1 of the lap belt portion 14A.

FIG. 2 shows the implementation of the solution according to the invention in a first exemplary embodiment using the right side panel $B_R$. The above explanations concerning the left panel $B_L$ also apply analogously to the right panel $B_R$.

FIG. 2 shows the right side panel $B_R$ in a somewhat perspective view from its exterior. In the critical region K and beyond, a first weakening structure S1 is formed, although it is formed on the inside of the side panel $B_R$ as illustrated in FIG. 3.

In the exemplary embodiment, the first weakening structure S1 comprises multiple indentations SXn (n=1, 2, 3, 4 . . . ) that are formed as semicircular indentations in the inner surface of the right side panel $B_R$, as is made clear by FIG. 3 viewed together with FIG. 2.

Arranged in the first exemplary embodiment are four (n=4) indentations SX1, SX2, SX3, SX4 extending essentially horizontally in the x-direction, which are referred to below as grooves or channels.

The grooves SX1, SX2, SX3, SX4 extend in lines that are arranged parallel to one another and are oriented substantially in the x-direction in the longitudinal direction X1 of the side panel $B_R$.

The grooves or channels are semicircular in design in the exemplary embodiment. It is a matter of course that this design represents one of many possible designs for the groove shape or channel shape.

In the first region B1 of the side panel $B_R$, the grooves SX3, SX4 extend from the recess 24 outside the critical region K, through the critical region K of the first region B1 toward the second region B2. Initially, after the critical region K, the grooves SX1, SX2, SX3, SX4 continue into the first region B1 and are then routed at least partially into the second region B2 of the side panel $B_R$.

In the first exemplary embodiment, the two grooves SX1, SX2 start in the horizontal wall region H1 in the first region B1 of the side panel $B_R$ and then transition with a slight downward inclination into the vertical wall region V1 of the first region B1 and thereafter into the second vertical wall region V2 of the second region B2.

In contrast, the two grooves SX3, SX4 start in the vertical wall region V1 in the first region B1 of the side panel $B_R$ and likewise transition with a slight downward inclination into the vertical wall region V2 of the second region B2 of the side panel $B_R$.

In an alternative variant embodiment, all grooves SX1, SX2, SX3, SX4 can start in the vertical wall region V1 in the first region B1 of the side panel $B_R$ and then transition straight—without downward inclination—into the vertical wall region V2 of the second region B2 of the side panel $B_R$.

This embodiment of the first weakening structure S1 brings about the following effects.

In the event of a possible crash, the lap belt portion 14A of the buckled seat belt 14 comes into full-area contact in the critical region K of the first region B1 with the first vertical wall region V1, and as this occurs force is initially applied into the first vertical wall region V1 with a transfer of force within the panel $B_R$ into the first horizontal wall region H1. The crash force thus normally causes a crack or break of the side panel $B_R$ in the first region B1 that runs in the belt axis direction 14A-1 crosswise to the longitudinal axis X1.

Due to the linear grooves SX1, SX2, SX3, SX4 that are arranged to be parallel to one another and are oriented substantially in the x-direction, which is to say in the longitudinal direction X1 of the side panel $B_R$, the first effect that is achieved is that the crack or break forms according to the invention in the longitudinal direction X1 crosswise to the belt axis direction 14A-1 of the side panel $B_R$.

Because the grooves SX1, SX2, SX3, SX4 are routed at least partially into the second region B2 of the side panel $B_R$, a second effect is achieved such that the crack or break—assisted by the continuation of the grooves SX1, SX2, SX3, SX4 into the second region B2—reliably extends into the second region B2 of the side panel $B_R$.

A third effect also results, namely that the side panel $B_R$ folds up, so to speak, in the longitudinal direction X1 with its inside facing toward the structure of the seat portion 12. The folding up of the side panel $B_R$ along at least one fracture edge extending in the longitudinal direction X1 is achieved in particular by the means that the first and second grooves SX1, SX2 start in the horizontal wall region H1 in the first region B1 of the side panel $B_R$ and transition into the vertical wall region V1 of the first region B1 and thereafter into the second vertical wall region V2. This means that, as a result, the horizontal wall region H1 is invisibly weakened on the inside by the grooves SX1 and SX2 in the transition region to the vertical wall region V1. The horizontal wall region H1 yields more easily in consequence of the crash force as soon as the force of the lap belt portion 14A acts on the horizontal wall region H1 due to the arrangement of the first and second grooves SX1, SX2. This effect is bolstered since the first and second grooves SX1, SX2 additionally create a transition from the first region B1 to the second region B2 between the vertical wall region V1 of the first region B1 and the second vertical wall region V2 with regard to the desired weakening in the direction of the longitudinal axis X of the panel $B_R$.

In any case, due to one of the said effects or to the combination of the said effects, at least one crack edge or fracture edge is produced along at least one of the grooves SX1, SX2, SX3, SX4 that is crosswise to the belt axis 14A-1 of the lap belt portion 14A, eliminating the risk that the edge region of the lap belt portion 14A could come into contact with sharp edges that are parallel to the edge of the lap belt portion 14A.

Instead, the lap belt portion 14A acts like a bandage wrapped around the crack or the break in the first region B1 of the side panel $B_R$, ensuring that the panel $B_R$ is held together after the break.

The horizontal grooves SX1, SX2, SX3, SX4 of the first weakening structure S1 extending substantially in the x-direction constitute linear predetermined breaking points in the side panel $B_R$, between which at least two side panel parts are created by a crack or break in the event of a crash in the longitudinal direction X1 of the side panel $B_R$, which panel parts are bundled by the lap belt portion 14A oriented crosswise thereto, and thus held securely together, as explained above.

Figure 3A:
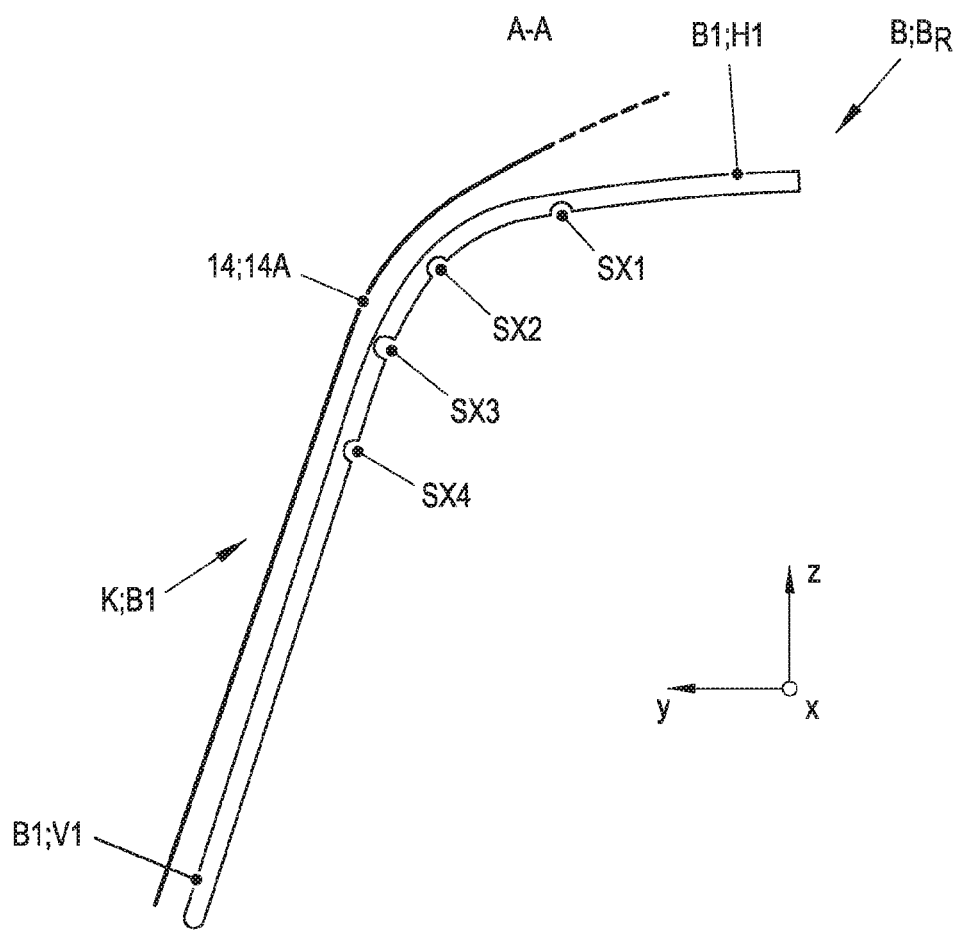
FIG. 3A is a section A-A through the right side panel from FIG. 2 with indentation SX3 being more deeply formed than other indentations.

In another alternative variant embodiment that is shown in FIG. 3A, at least one of the horizontal grooves SX1, SX2, SX3, SX4 extending in the x-direction, e.g., groove SX3, is made more deeply in the material of the side panel $B_R$ than the neighboring groove(s).

This achieves the result that one of the grooves SX1, SX2, SX3, SX4, for example the groove SX3, is designed to be especially weakened as compared to the other grooves SX1, SX2, SX4. The effect achieved is that, in the event of a crash, this groove SX3 breaks first and reliably in the longitudinal direction X1 of the side panel $B_R$.

If a break is intended in the transition region of the horizontal wall region H1 to the vertical wall region V1, the groove SX2 and/or SX3, for example, is/are designed to be especially weakened as compared to the other grooves SX1, SX4 so that the weakest region is formed in the transition region.

It is a matter of course that this effect can be achieved even with a single groove SX1, SX2, SX3, SX4. In this respect, it is not mandatory to form a weakening structure S1 with multiple grooves SX1, SX2, SX3, SX4. However, it has become apparent that the formation of a weakening structure S1 with multiple grooves or channels SX1, SX2, SX3, SX4 brings about a higher probability that at least one of the grooves or channels SX1, SX2, SX3, SX4 created as predetermined breaking points will produce the desired effects, namely that the side panel tears or breaks in a defined and controlled way at the intended location and in the intended length in the longitudinal direction X1.

FIG. 4 shows the implementation of the solution according to the invention in a second exemplary embodiment.

FIG. 4 shows the left side panel $B_L$ analogously to FIG. 1, likewise in a somewhat perspective view, but from its inside. In the critical region K, a second weakening structure S2 is formed that differs from the first weakening structure S1 of the first exemplary embodiment.

Arranged in the second exemplary embodiment are eight (n=8) horizontal indentations SX1 to SX8 routed in the x-direction, which likewise are implemented as grooves or channels on the inside of the left side panel $B_L$. To ensure clarity, only the indentations S1, S3 and S8 are labeled in FIG. 4.

In this design, the grooves SX1 and SX2 are arranged in the horizontal wall region H1 of the first region. In the first region B1 of the side panel $B_L$, the grooves SX1 and SX2 extend from the recess 24 outside of the critical region K, through the critical region K of the first region B1, and pass through the critical region K. After passing through the critical region K, they are routed up to the second region B2.

In similar fashion to the first exemplary embodiment, a third horizontal groove SX3 extending in the x-direction is arranged between the recess 24 and the second region B2, with this third groove SX3 likewise starting at the edge of the recess 24, running through the critical region K, and then extending in the direction of the second region B2 of the side panel $B_L$ up to the second region B2. In analogous fashion to the first exemplary embodiment (the grooves SX2 and/or SX3 there), a distinctive feature provides that this third groove SX3 is located in the transition region between the horizontal wall region H1 and the vertical wall region V1 of the first region B1.

The horizontal grooves SX4 to SX8 extending in the x-direction that adjoin the third groove SX3 are arranged to be parallel to the third groove SX3 in the vertical wall region V1 of the first region B1 of the side panel $B_L$.

Furthermore, additional indentations SY1 to SY8 and SZ1 to SZ8 are formed that are perpendicular to the said indentations SX1 to SX8.

The indentations SY1 to SY8 are horizontal grooves extending in the y-direction that are located in the x-y plane of the first horizontal wall region H1 of the first region B1. To ensure clarity and to stand in for the indentations SY1, SY2, SY3, SY4, SY5, SY6, SY7 and SY8, only the reference numbers SY1 and SY8 are marked.

The indentations SZ1 to SZ8 are vertical grooves extending in the z-direction that are located in the x-z plane of the first vertical wall region V1 of the first region B1. Standing in for the indentations SZ1, SZ2, SZ3, SZ4, SZ5, SZ6, SZ7 and SZ8, only the reference numbers SZ1 and [note: the German has a typo here, the word for "us" (uns) is there instead of the word for "and" (und)] SZ8 are marked.

The indentations or grooves SY1 to SY8 intersect the indentations SX1 to SX8 in the horizontal wall region H1 of the first region B1 of the side panel $B_L$, and there they create the grid structure formed as the second weakening structure S2.

The indentations or grooves SZ1 to SZ8 intersect the indentations SX1 to SX8 in the vertical wall region V1 of the first region B1 of the side panel $B_L$, and there they create the grid structure formed as the second weakening structure S2.

The grid structures of the second weakening structure S2 in the horizontal wall region H1 and in the vertical wall region V1 are connected to one another by the indentation labeled with the reference number SX3.

This exemplary embodiment dispenses with routing the indentations SX1 to SX8 into the second region B2 of the side panel $B_L$, with it being expressly noted that the possibility also exists to make the indentations SX1 to SX8, in particular, longer so that they connect the first region B1 to the second region B2 through the indentations SX1 to SX8. This also applies, incidentally, to the indentations SY1 to SY8 and SZ1 to SZ8 perpendicular thereto, which can be continued in the direction of the axis X1 of the side panel into the second region B2.

The embodiment of the second weakening structure S2 shown in FIG. 4 brings about the following effects:

In the event of a possible crash, the lap belt portion 14A of the buckled seat belt comes into full-area contact in the critical region K of the first region B1 with the first vertical wall region V1, and as this occurs, as already explained, force is initially applied into the first vertical wall region V1 with a transfer of force within the side panel $B_L$ into the first horizontal wall region H1. As explained, the crash force normally causes a crack or a break of the side panel $B_L$ in the first region B1 that runs in the belt axis direction 14A-1 crosswise to the longitudinal axis X1. Due to the linear grooves SX1 to SX8 that are arranged to be parallel to one another and are oriented substantially in the x-direction in the longitudinal direction X1 of the side panel 10, the first effect that is achieved is that the crack or break now forms in the longitudinal direction X1 crosswise to the belt axis direction 14A-1 of the side panel $B_L$.

A second effect also results, namely that the side panel $B_L$ folds up in the longitudinal direction X1 with the inside of the side panel $B_L$ facing toward the structure of the seat portion. The folding up of the side panel $B_L$ is achieved in particular by the means that grooves SY1 to SY8 or SZ1 to SZ8, respectively, are arranged in the horizontal wall region H1 and in the vertical wall region V1, in each case perpendicular to the linear grooves SX1 to SX8. As a result, the wall regions V1, H1 are weakened in their material such that they yield more easily to the crash force than is the case in conventional side panels.

The groove SX3, along which the adjoining wall regions V1, H1 yield, is formed especially in the transition region between the horizontal wall region H1 and the vertical wall region V1 in the first region B1 of the side panel $B_L$, so that the side panel $B_L$ tears or breaks along the horizontal groove SX3 in the direction of the longitudinal axis X1 of the side panel $B_L$.

In addition, in the event of a very high application of force, any additional indentations that are designed as predetermined breaking points may also break, particularly in the vertical wall region V1, in which the indentations SX4 to SX8 are formed.

In order to assist the desired crack formation or break formation in the longitudinal direction X1, in an alternative variant embodiment provision is made that at least one of the indentations SX1 to SX8 located in the x-direction is made more deeply in the material of the side panel $B_L$ than the indentations SY1 to SY8 horizontally perpendicular thereto and the indentations SZ1 to SZ8 vertically perpendicular thereto.

In analogous fashion to the first exemplary embodiment, due to one of the said effects or due to the combination of the said effects, at least one crack edge or fracture edge is produced in any case that is crosswise to the belt axis 14A-1 of the lap belt portion 14A, eliminating the risk that the edge region of the lap belt portion 14A could come into contact with sharp edges that are parallel to the edge of the lap belt portion 14A.

Instead, the lap belt portion acts like a bandage wrapped around the crack or the break of the side panel $B_L$ in the first region B1. This effect has already been explained appropriately for the first exemplary embodiment. Because of the lap belt portion 14A, a bundling occurs of the side panel parts created in the deformation zone by the at least one crack or break.

In both of the exemplary embodiments shown and explained, the particular side panel $B_L$, $B_R$ has a recess 24. It is noted here once again that the formation of the two weakening structures S1, S2 discussed does not of necessity have to be located between such a recess 24 and a second region B2.

It is a matter of course that side panels $B_L$, $B_R$ also form the critical region K without such an indentation at the point of contact of the lap belt portion 14A analogous to the foregoing description, so that the corresponding indentations SXn, SYn, SZn extend to both sides of the critical region K in a predefinable length in the x-direction depending on the implementation of the weakening structure.

Thus, the possibility also exists to form the indentations SXn, SYn, SZn extending in the x-direction over the entire length of the side panel $B_L$ when viewed in the longitudinal direction X1, depending on the implementation of the weakening structure.

This even more reliably achieves the effect that, in the event of a crash, the side panel $B_L$ breaks or tears in a defined and controlled way as per the foregoing explanations, at the predetermined breaking point provided for this purpose, over the entire length, in the longitudinal direction X1, in at least one of the horizontal indentations SXn.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

LIST OF REFERENCE NUMBERS 100 vehicle seat
10 backrest portion
12 seat portion
14 seat belt
14A lap belt portion
14A-1 belt axis of the lap belt portion
14B mounting element
14C seat belt buckle
16 height adjustment lever
18 opening
20 seatback release lever 22 opening
recess
B side panel
$B_L$ left panel
$B_R$ right panel
P operating position
K critical region/deformation zone
B1 first region
H1 first horizontal wall region
V1 first vertical wall region
B2 second region
H2 second horizontal wall region
V2 second vertical wall region
S1 first weakening structure
S2 second weakening structure
n number of indentations
SXn nth horizontal indentation in the x-direction
SYn nth horizontal indentation in the y-direction
SZn nth vertical indentation in the z-direction
x direction in or opposite to the customary direction of travel of a vehicle
X1 longitudinal axis of the panel B
y direction in the horizontal plane perpendicular to the x-direction
z direction in the vertical plane perpendicular to the x-direction

What is claimed is:

1. A vehicle seat comprising:
a seat-mounted cover that includes a side panel; and
at least one predetermined breaking point formed at least in a first region of the side panel in which a high crash force acts in the event of a crash,
wherein the at least one predetermined breaking point is at least one linear indentation, and
wherein the at least one linear indentation is formed on an inside surface of the side panel, such that the at least one linear indentation is not visible on an outside surface of the side panel.

2. The vehicle seat according to claim 1, wherein the inside surface of the side panel includes a vertical wall region connected to a horizontal wall region, and wherein the at least one linear indentation extends continuously from the horizontal wall region, through a transition point between the horizontal wall region and the vertical wall region and into the vertical wall region.

3. The vehicle seat according to claim 1, wherein the inside surface of the side panel faces toward a seat cushion of the vehicle seat.

4. A side panel of a cover of a vehicle seat, the side panel comprising at least one predetermined breaking point formed in the side panel in a first region in which a high crash force acts in the event of a crash,
wherein the at least one predetermined breaking point is at least one linear indentation, and
wherein the at least one linear indentation is formed on an inside surface of the side panel, such that the at least one linear indentation is not visible on an outside surface of the side panel.

5. The side panel according to claim 4, wherein the at least one linear indentation extends substantially in a longitudinal direction of the side panel, wherein the longitudinal direction corresponds to a movement direction of a vehicle that includes the side panel.

6. The side panel according to claim 4, wherein the at least one linear indentation is arranged to extend substantially horizontally, at least in a vertical wall region located in the first region of the side panel.

7. The side panel according to claim 6, wherein the at least one linear indentation is arranged to extend substantially horizontally in a horizontal wall region located in the first region and to extend into the vertical wall region located in the first region of the side panel.

8. The side panel according to claim 4, wherein the at least one linear indentation is part of a weakening structure.

9. The side panel according to claim 8, wherein the weakening structure comprises multiple linear indentations that are arranged to be substantially parallel to one another and to extend substantially horizontally in a longitudinal direction of the side panel, wherein the longitudinal direction corresponds to a movement direction of a vehicle that includes the side panel.

10. The side panel according to claim 9, wherein at least one of the multiple linear indentations, which is arranged to be parallel to one another and to extend substantially horizontally in the longitudinal direction of the side panel, is formed more deeply in a material of the side panel than a neighboring indentation.

11. The side panel according to claim 8, wherein the weakening structure is a grid structure that comprises multiple linear indentations that are arranged to be substantially parallel to one another and to extend substantially horizontally in a longitudinal direction of the side panel, and wherein multiple linear indentations are arranged to extend substantially perpendicular to the multiple linear indentations arranged horizontally in the longitudinal direction, wherein the longitudinal direction corresponds to a movement direction of a vehicle that includes the side panel.

12. The side panel according to claim 4, wherein the inside surface of the side panel includes a vertical wall region connected to a horizontal wall region, and wherein the at least one linear indentation extends continuously from the horizontal wall region, through a transition point between the horizontal wall region and the vertical wall region and into the vertical wall region.

13. The side panel according to claim 4, wherein the inside surface of the side panel faces toward a seat cushion of the vehicle seat.

* * * * *